(12) United States Patent
Sick et al.

(10) Patent No.: US 12,209,368 B2
(45) Date of Patent: Jan. 28, 2025

(54) SYNTHETIC TURF WITH HIGH DRAINAGE AND MANUFACTURING THEREOF

(71) Applicants: Synthetic Turf Resources Corp., Dalton, GA (US); Polytex Sportbelage Produktions-GmbH, Grefrath (DE)

(72) Inventors: Stephan Sick, Willich-Neersen (DE); Kristan Michael Brown, Dalton, GA (US); Matthew Lee Henson, Acworth, GA (US); Chad D. Lands, Chatsworth, GA (US); Erin Anderson Tidwell, Caulhoun, GA (US)

(73) Assignees: Synthetic Turf Resources Corp., Dalton, GA (US); Polytex Sporbeläge Produktions-GmbH, Grefrath (DE)

( * ) Notice: Subject to any disclaimer, the term of this patent is extended or adjusted under 35 U.S.C. 154(b) by 179 days.

(21) Appl. No.: 16/959,610

(22) PCT Filed: Dec. 19, 2018

(86) PCT No.: PCT/EP2018/085732
§ 371 (c)(1),
(2) Date: Jul. 1, 2020

(87) PCT Pub. No.: WO2019/134827
PCT Pub. Date: Jul. 11, 2019

(65) Prior Publication Data
US 2020/0385936 A1     Dec. 10, 2020

Related U.S. Application Data

(60) Provisional application No. 62/614,519, filed on Jan. 8, 2018.

(30) Foreign Application Priority Data

Mar. 9, 2018 (EP) .................................. 18161115

(51) Int. Cl.
E01C 13/08 (2006.01)
B32B 5/02 (2006.01)
(Continued)

(52) U.S. Cl.
CPC .............. *E01C 13/08* (2013.01); *B32B 5/026* (2013.01); *B32B 27/12* (2013.01); *B32B 27/40* (2013.01);
(Continued)

(58) Field of Classification Search
CPC .... E01C 13/08; D06N 7/0071; D06N 7/0065; D06N 2213/061; D06N 2209/126;
(Continued)

(56) References Cited

U.S. PATENT DOCUMENTS 2,999,763 A * 9/1961 Sommer ................. D06Q 1/10
427/206
3,332,828 A * 7/1967 Faria ...................... E01C 13/08
428/17
(Continued)

FOREIGN PATENT DOCUMENTS

EP         3122942 B1    1/2018
GB         2311247 A     9/1997
WO    WO-2015144223 A1 * 10/2015  ........... D01D 5/0885

OTHER PUBLICATIONS

International Preliminary Report on Patentability and Written Opinion for PCT/EP2018/085732 dated Jul. 23, 2020.
(Continued)

*Primary Examiner* — Cheryl Juska
(74) *Attorney, Agent, or Firm* — Harness, Dickey & Pierce, P.L.C.

(57) ABSTRACT

A synthetic turf (300) includes a plurality of synthetic turf fibers (102) knitted together to form a knitted backing layer
(Continued)

(104) of the synthetic turf, and a water permeable polyurethane coat (114) formed on the knitted backing layer.

13 Claims, 4 Drawing Sheets

(51) Int. Cl.
 *B32B 27/12* (2006.01)
 *B32B 27/40* (2006.01)
 *D06N 7/00* (2006.01)
(52) U.S. Cl.
 CPC ......... *D06N 7/0065* (2013.01); *D06N 7/0071* (2013.01); *B32B 2255/02* (2013.01); *B32B 2255/26* (2013.01); *B32B 2307/726* (2013.01); *B32B 2375/00* (2013.01); *D06N 2203/068* (2013.01); *D06N 2209/126* (2013.01); *D06N 2213/061* (2013.01); *D10B 2505/202* (2013.01); *Y10T 428/23979* (2015.04); *Y10T 428/23993* (2015.04)
(58) Field of Classification Search
 CPC ...... D06N 2203/068; Y10T 428/23993; Y10T 428/23979; D10B 2505/202; D04B 21/02; D04B 21/04; B32B 2255/02; B32B 2266/0278; B32B 2307/726; B32B 2375/00
 See application file for complete search history.

(56) References Cited

U.S. PATENT DOCUMENTS

| | | | | |
|---|---|---|---|---|
| 4,535,021 | A * | 8/1985 | Friedrich | E01C 13/08 428/17 |
| 5,395,467 | A * | 3/1995 | Rogers, Jr. | D05C 17/02 428/17 |
| 5,567,497 | A * | 10/1996 | Zegler | B32B 27/12 428/95 |
| 2001/0033902 | A1* | 10/2001 | Seaton | E01C 13/08 428/17 |
| 2004/0191469 | A1* | 9/2004 | Brodeur, Jr. | D06N 7/0081 428/95 |
| 2006/0013989 | A1 | 1/2006 | Stull et al. | |
| 2010/0129571 | A1* | 5/2010 | Bearden | E01C 13/08 428/17 |
| 2015/0028510 | A1* | 1/2015 | Liu | A61L 26/0019 264/49 |
| 2017/0081808 | A1* | 3/2017 | Lee | D04B 21/12 |

OTHER PUBLICATIONS

International Search Report for International Application PCT/EP2018/085732 dated Apr. 5, 2019.
Written Opinion for International Application PCT/EP2018/085732 dated Apr. 23, 2019.
Office Action for European Application No. 18 161 115.3 dated Aug. 6, 2020.

* cited by examiner

SYNTHETIC TURF WITH HIGH DRAINAGE AND MANUFACTURING THEREOF

This application is a national phase under 35 U.S.C. § 371 of PCT International Application No. PCT/EP2018/085732 which has an International filing date of Dec. 19, 2018 which claims priority to European Patent Application No. 18 161 115.3, filed Mar. 9, 2018, and U.S. Provisional Application No. 62/614,519, filed Jan. 8, 2018, the entire contents of each of which are hereby incorporated by reference.

FIELD OF THE INVENTION

The present invention relates to synthetic turfs that are also referred to as artificial turf, and, more particularly, to ultralight high drainage synthetic turfs, and manufacture thereof.

BACKGROUND OF THE INVENTION

Artificial turf or artificial grass is surface that is made up of fibers which is used to replace grass. The structure of the artificial turf is designed such that the artificial turf has an appearance which resembles grass. Typically, artificial turf is used as a surface for sports such as soccer, American football, rugby, tennis, golf, or for other playing fields or exercise fields. Furthermore, artificial turf is frequently used for landscaping applications. An advantage of using artificial turf is that it eliminates the need to care for a grass playing or landscaping surface, like regular mowing, scarifying, fertilizing, and watering.

Conventionally, artificial includes an artificial turf backing. The artificial turf backing typically contains a carrier layer and a coating layer positioned on a bottom side of the carrier layer. The artificial turf also includes artificial turf fibers that have been tufted into the carrier layer of the artificial turf backing. The coating layer serve to mechanically bind the tufted artificial turf fibers. Various types of glues, coatings or adhesives are used for the coating layer, in particular PU backings, which are impermeable to liquids.

To facilitate drainage, holes are drilled through the artificial turf backing. However, drilling or otherwise forming holes through the artificial turf is costly, in terms of time and equipment, and in addition, holes are formed in the artificial turf backing using a predefined pattern. For example, if the artificial turf has manufacturing inconsistencies that lead to localized regions where water may tend to collect, a periodic drilling pattern may not allow proper drainage in these localized regions. Alternatively or in addition, this may be due to unevenness of the topology of the ground on which the artificial turf is installed. Furthermore, the conventional combination of a carrier layer with a coating layer introduces weight into the artificial turf system, which increases manufacturing costs, transportation costs, and increases the difficulty of installation.

Knitting of artificial turf is as such also known from the prior art, c.f. Knitting Technology, David J. Spencer, Elsevier, 2014, page 327.

Primary backings into which fibers are attached and to which non-permeable adhesives are applied as uniform films are known from the prior art, cf. Stull et al., patent application publication no. US 2006/013989.

What is needed in the art is a system and method that can overcome some of the previously described disadvantages of known artificial turfs.

SUMMARY OF THE INVENTION

In accordance with an aspect of the present invention, there is provided a synthetic turf, including a plurality of synthetic turf fibers knitted together to form a knitted backing layer of the synthetic turf, and a polyurethane, PU, coat on the knitted backing layer.

In accordance with embodiments, the PU coat is water permeable and preferably has no or no substantial sealing effect on the knitted backing layer. This may due to a porosity of the PU coat, and/or openings that are formed in the PU coat at random locations, and/or forming the openings of the PU coat underneath and/or aligned with openings provided in the knitted backing layer that are given by the knitting process. The PU coat may have an open surface that is larger than its closed surface. The PU coat may be formed by PU deposits at least some of which may be interconnected to provide additional structural stability or unconnected deposits to provide enough weight on the backing for the artificial turf to lay flat on the ground.

In accordance with embodiments of the invention, the water permeability of the artificial turf with the PU coated backing is between 100% and 50%, in particular 100% to 80%, in particular 95% to 85% of the knitted backing layer without the PU coat.

In accordance with embodiments of the invention, the water permeability of the PU coated artificial turf is between 700 and 1300 liters per minute and square meter (l/min*m2), in particular between 800 and 1200 l/min*m2, in particular 1100 to 1150 l/min*m2 as measured according to ASTM F 1551 which is equivalent to water permeability as specified in DIN 18035/7.

According to another aspect of the present invention, each synthetic turf fiber of the plurality of synthetic turf fibers includes one of a monofilament and a yarn. The yarn may include a bundle of interlocking monofilaments.

According to another aspect of the present invention, one or more synthetic turf fibers of the plurality of synthetic turf fibers are curled.

According to another aspect of the present invention, the PU coat comprises a random distribution of PU deposits, enabling the PU coat to be water permeable.

According to another aspect of the present invention, the random distribution of PU deposits covers between 10% to 50% of a surface area of the knitted backing layer.

According to another aspect of the present invention, each PU deposit of the PU deposits is porous to water.

According to another aspect of the present invention, each PU deposit of the PU deposits comprises one or more capillaries.

According to another aspect of the present invention, the PU coat is porous to water.

According to another aspect of the present invention, the PU coat comprises one or more capillaries.

According to another aspect of the present invention, the PU coat is an isocyanate mixture.

According to another aspect of the present invention, the isocyanate mixture may include a 2,2'-diphenylmethane diisocyanate (2,2'-MDI)-based isocyanate mixture.

According to another aspect of the present invention, the PU coat includes at least one water soluble salt. The at least one water soluble salt may be at least one of a sodium chloride salt, an ammonium salt, and a benzalkonium chloride salt.

According to another aspect of the present invention, the PU includes a chalk.

According to another aspect of the present invention, the PU coat is a cured PU coat.

According to another aspect of the present invention, the PU coat coats the knitted backing layer at at least 50 g/m², preferably at least 100 g/m², preferably between at 250-300 g/m²

Embodiments of the invention are particularly beneficial as the PU is deposited on the knitted backing by depositing of a PU foam that collapses before it binds. This creates a random yet macroscopically uniform distribution of insular PU deposits that provides enough weight for form stability of the artificial turf, such that the artificial turfs lays flat on a surface and still has good permeability for water and urine. The resultant PU deposits may or may not be connected by PU.

According to another aspect of the present invention, the PU coat is formed from PU deposits, thereby enabling the coat to be water permeable.

According to another aspect of the present invention, the PU coat comprises a random or pseudo-random distribution of PU deposits and wherein the distribution of PU deposits enables the PU coat to be water permeable. The pseudo-random distribution of PU deposits may be fabricated by using a mask or screen through which the PU is applied onto the backing.

According to another aspect of the present invention, the knitted backing layer has a surface area, and wherein the distribution of PU deposits covers at least 1%, preferably at least 10%, preferably between 10% to 50% of the surface area.

According to another aspect of the present invention, the synthetic turf is used to provide a habitat for animals, such as mammals that urinate on the ground, and ground flooring for animal stables.

In accordance with an aspect of the present invention, there is provided a method for manufacturing a synthetic turf, including knitting together a plurality of synthetic turf fibers for forming a knitted backing layer of the synthetic turf, and applying a polyurethane, PU, to the knitted backing layer for forming a PU coat.

According to another aspect of the present invention, each synthetic turf fiber of the plurality of synthetic turf fibers includes one of a monofilament and a yarn. The yarn may include a bundle of interlocking monofilaments.

According to another aspect of the present invention, the method further includes curling one or more synthetic turf fibers of the plurality of synthetic turf fibers before knitting together the plurality of synthetic turf fibers.

According to another aspect of the present invention, applying the PU to the knitted backing layer comprises applying the PU as a PU foam, wherein upon collapse of the PU foam, the PU coat comprises a random distribution of PU deposits, and wherein the random distribution of PU deposits enables the PU coat to be water permeable.

According to another aspect of the present invention, the method further includes creating the PU foam by adding a foaming additive to the PU and/or mechanically agitating the PU. The PU foam may be an unpolymerized foam.

According to another aspect of the present invention, mechanically agitating the PU includes at least one of mixing the PU and applying pressure pulses to the PU.

According to another aspect of the present invention, the unpolymerized foam has a density between 100-700 grams per liter, in particular 150-600 grams per liter, in particular 300-400 grams per liter.

According to another aspect of the present invention, the PU includes an isocyanate mixture.

According to another aspect of the present invention, the isocyanate mixture is a 2,2'-diphenylmethane diisocyanate (2,2'-MDI)-based isocyanate mixture.

According to another aspect of the present invention, the PU coat comprises a hydrolysis stabilizer for an improved lifetime of the synthetic turf even if cleaned frequently. In accordance with embodiments, polybutadiene diol, in particular hydroxyl-terminated polybutadiene resin as commercial available from Cray Valley as Krasol® (http://www.crayvalley.com/products/krasol-), is used as a hydrolysis stabilizer. Alternatively or in addition, the PU is made from polyether polyol for improved hydrolysis stability. Polyetherpolyols are intermediates for the manufacturing of a polyurethanes, through the reaction with isocyanates.

According with embodiments of the invention, the PU is made from Polypropylene glycol, such as Polypropylene glycol having a molecular weight of 4000 (PPG 4000) or a mixture of Polypropylene glycol and Dipropylene glycol (DPG) and/or Diethylene glycol (DEG), such as 85% PPG 4000 and 15% DPG, for improved hydrolysis stability.

According with embodiments of the invention, the PU is made from polyester polyols but not from polyether polyols. The polyester polyol may be combined with an isocyanate crosslinker, such as dihydrazide, in particular adipic acid dihydrazide (ADH), to provide PU that has excellent resistance to hydrolysis. According to another aspect of the present invention, the PU includes at least one water soluble salt.

According to another aspect of the present invention, the at least one water soluble salt includes at least one of a sodium chloride salt, an ammonium salt, and a benzalkonium chloride salt.

According to another aspect of the present invention, the PU includes a chalk.

According to another aspect of the present invention, applying the PU to the knitted backing layer comprises applying a knife over roll coating of the knitted backing layer for forming the PU coat.

According to another aspect of the present invention, the method further includes curing the PU coat.

According to another aspect of the present invention, the method further includes forming the PU coat by PU deposits.

According to another aspect of the present invention, the method further includes curing the PU coat at 80° C. for coating the knitted backing layer at 60 g/m² to 600 g/m², in particular 80 g/m² to 500 g/m², in particular 250-300 g/m²

BRIEF DESCRIPTION OF THE DRAWINGS

The above-mentioned and other features and advantages of this invention, and the manner of attaining them, will become more apparent and the invention will be better understood by reference to the following description of exemplary embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
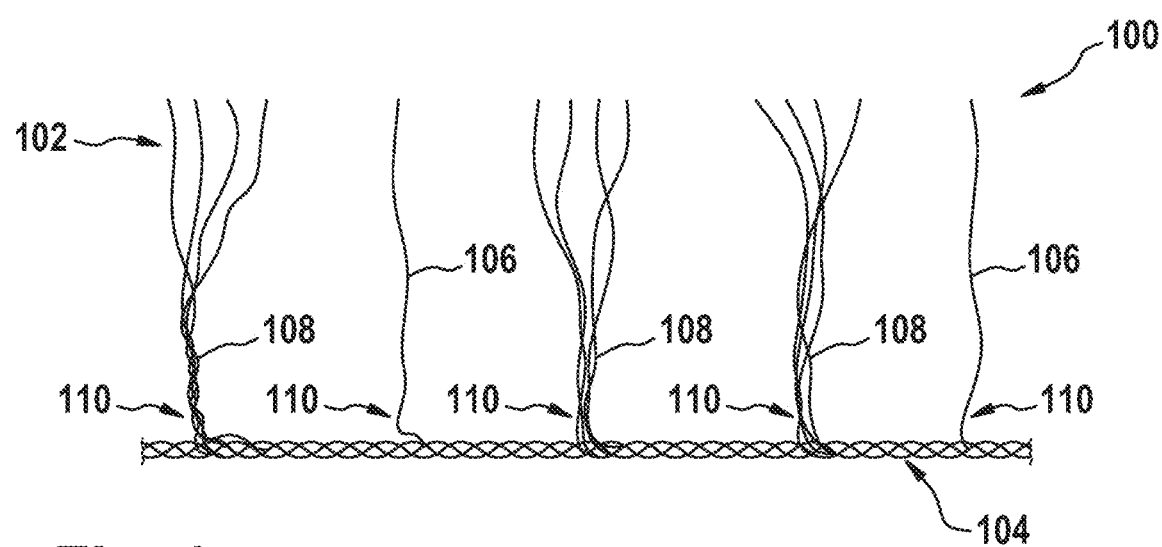
FIG. 1 is an exemplary embodiment of a synthetic turf, formed in accordance with the present invention.

Referring now to the drawings, and more particularly to FIG. 1, there is shown a synthetic turf 100 according to an embodiment of the present invention. The synthetic turf 100 includes synthetic turf fibers 102 knitted together to form a knitted backing layer 104. As illustrated, synthetic turf fibers 102 may comprise a single monofilament 106 or a plurality of single monofilaments interlocked (e.g., twisted) together, also referred to as a yarn 108. Although the synthetic turf 100, as illustrated, includes a mixture of synthetic turf fibers 102 including monofilaments 106 and yarn 108, the scope of the present invention covers synthetic turfs formed only of monofilaments 106 and synthetic turfs formed only of yarn 108. The synthetic turf fibers 102 may be formed from plastic or any type of polymer as is common in the art.

In one embodiment, the synthetic turf fibers 102 are substantially straight. In another embodiment, one or more of the synthetic turf fibers may be curled (not shown), for example, to add support to adjacent fibers that are not curled (i.e., are substantially straight), to give a more plush and fuller appearance and/or to give more cushion to any forces applied from above, such as forces from people or animals walking or running on a top surface of the synthetic turf 100.

In one embodiment, the lower portions 110 of the fibers 102 are knitted together with each other, thereby forming the knitted backing layer 104 of the synthetic turf 100. Conventionally, turf fibers are tufted with a mat or a separate turf backing. However, the synthetic turf 100 according to the present invention includes the knitted backing layer 104 that is formed from knitting the lower portions 110 of the fibers 102 together, without any additional mat or separate turf backing layer. The synthetic turf fibers 102 of the present invention are knitted together, removing the conventional requirement of providing for a separate backing layer to which the fibers are secured and/or tufted.

In one embodiment, the lower portions 110 of the fibers 102 may be twisted about each other, or otherwise knitted to one another, thereby forming a bundle of twisted lower portions of fibers that extend along a direction parallel to a row of fibers. Parallel rows of twisted lower portions of fibers, crossing approximately perpendicular to other parallel rows of twisted lower portions of fibers, may be knitted together to form the knitted backing layer 104 of the synthetic turf 100 as a grid type pattern.

The fibers 102 may comprise a single polymer, such as polyethylene (PE), a mixture of miscible polymers, or a polymer mixture of immiscible polymers. In accordance with embodiments, the polymer mixture is at least a three-phase system, wherein the polymer mixture comprises a first polymer, a second polymer, and a compatibilizer, wherein the first polymer and the second polymer are immiscible, wherein the first polymer forms polymer beads surrounded by the compatibilizer within the second polymer as disclosed in EP3122942 the entirety of which being expressly herein incorporated by reference; the polymer mixture may be a PE and polyamide (PA) mixture, a PE and polyester mixture, a polypropylene (PP) and polyester mixture, or PP and PA mixture with a respective compatibilizer.

Lines 112, one of which is shown by way of example in FIG. 1, may be knitted into the backing to form the knitted backing layer 112 to provide reinforcement and improved dimensional stability. Theses lines extend only into the direction of the knitted backing layer 112 and do not protrude therefrom in contrast to the fibers 102.

Figure 2:
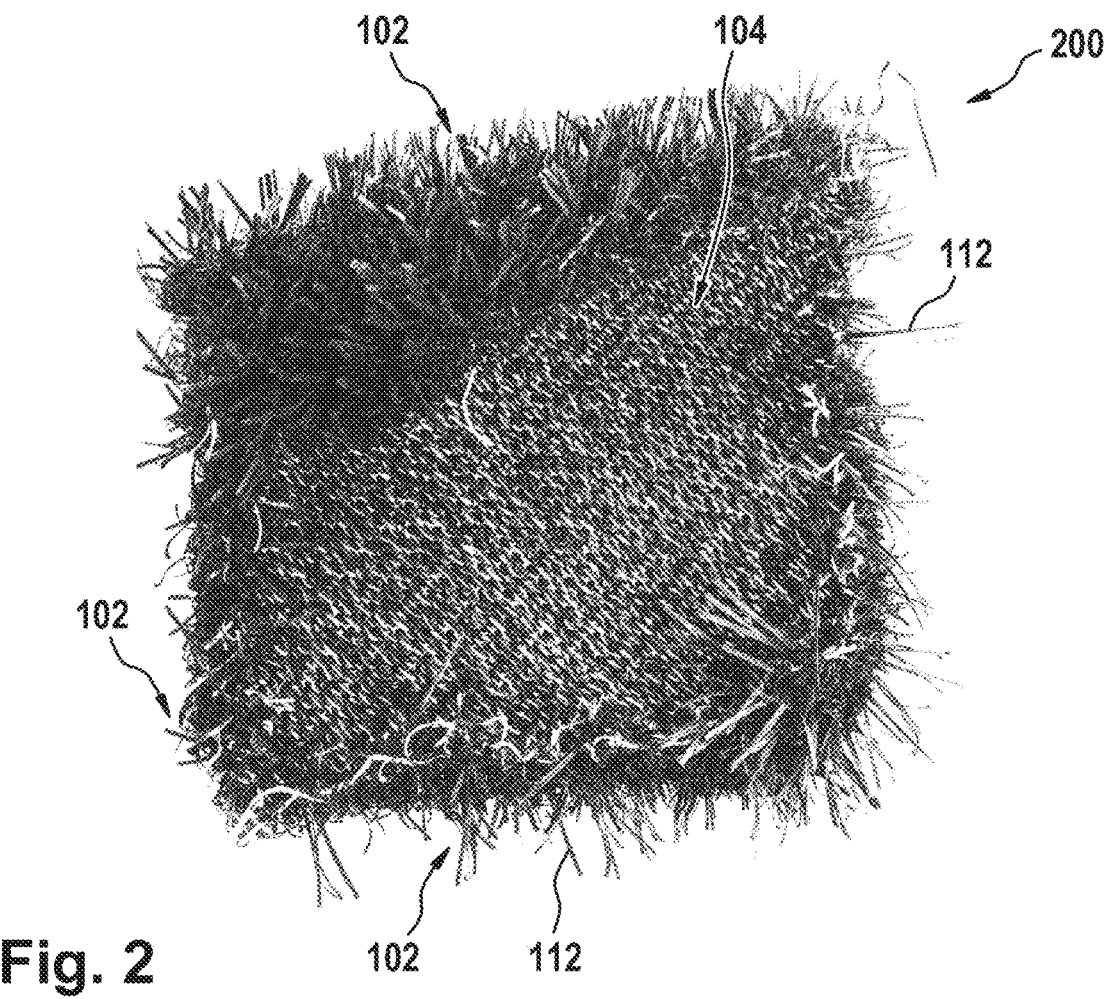
FIG. 2 is an exemplary embodiment of a synthetic turf sample, formed in accordance with the present invention.

FIG. 2 illustrates a synthetic turf 200, according to another embodiment of the present invention. Reference numbers which are the same as FIG. 1 reference numbers refer to identical elements. The synthetic turf 200 includes synthetic turf fibers 102 and a knitted backing layer 104 formed by knitting the lower portions 110 (see FIG. 1) of each of the fibers 102. Anchoring lines 112 may be knitted into the backing layer to provide additional dimensional stability of the synthetic turf 200.

The lines 112 may be arranged in parallel or in a grid as illustrated in FIG. 2. The lines 112 may or may not have the same color as the turf fibers 102. In one embodiment, the anchoring lines 112 are strings, comprised of the same material as the synthetic turf fibers 102, although the invention contemplates strings comprised of any durable and lightweight material, such as plastic.

In accordance with embodiments of the invention the anchoring lines 112 are formed by monofilaments, such as polyester (PES) and/or polypropylene (PP).

In accordance with embodiments of the invention the anchoring lines 112 are formed of a polymer material that has a polar surface, such as polyester (PES), for improved adhesion of the PU deposits that form the PU coat as PU is also polar. This embodiment may have the additional advantage of the PES having a lower degree of shrinkage in comparison to the synthetic turf fibers 102 when subjected to high temperatures, such that it also provides dimensional stability when the synthetic turf is moved through the oven 600 (cf. FIG. 6). The anchoring lines 112 may cross each other at any angles, and thus are not constrained to form a two-dimensional orthogonal gridded network of lines, but may form an irregularly-structured gridded network to which the lower portions 110 of the synthetic turf fibers 102 may be tied or knitted. Furthermore, the anchoring lines 112 may be knitted to any number of other anchoring lines 112, and thus the lower portions 110 of each of the fibers 102 in combination with the anchoring lines 112 form the knitted backing layer 104 of the synthetic turf 200.

As illustrated in FIG. 2, the synthetic turf 200 does not lie flat in a plane, but is twisted (i.e., it is dimensionally or spatially unstable). This is due, at least in part, from not using a conventional artificial turf backing to which the synthetic turf fibers are tufted, but instead, using the synthetic turf fibers 102 themselves to form the knitted backing layer 104 for the synthetic turf 200.

FIGS. 1 and 2 provide two exemplary embodiments, however the scope of the present invention contemplates all known systems and methods of knitting together bottom portions of synthetic turf fibers of a synthetic turf, with or without anchoring lines, for forming a knitted backing layer of the synthetic turf.

Figure 3A:
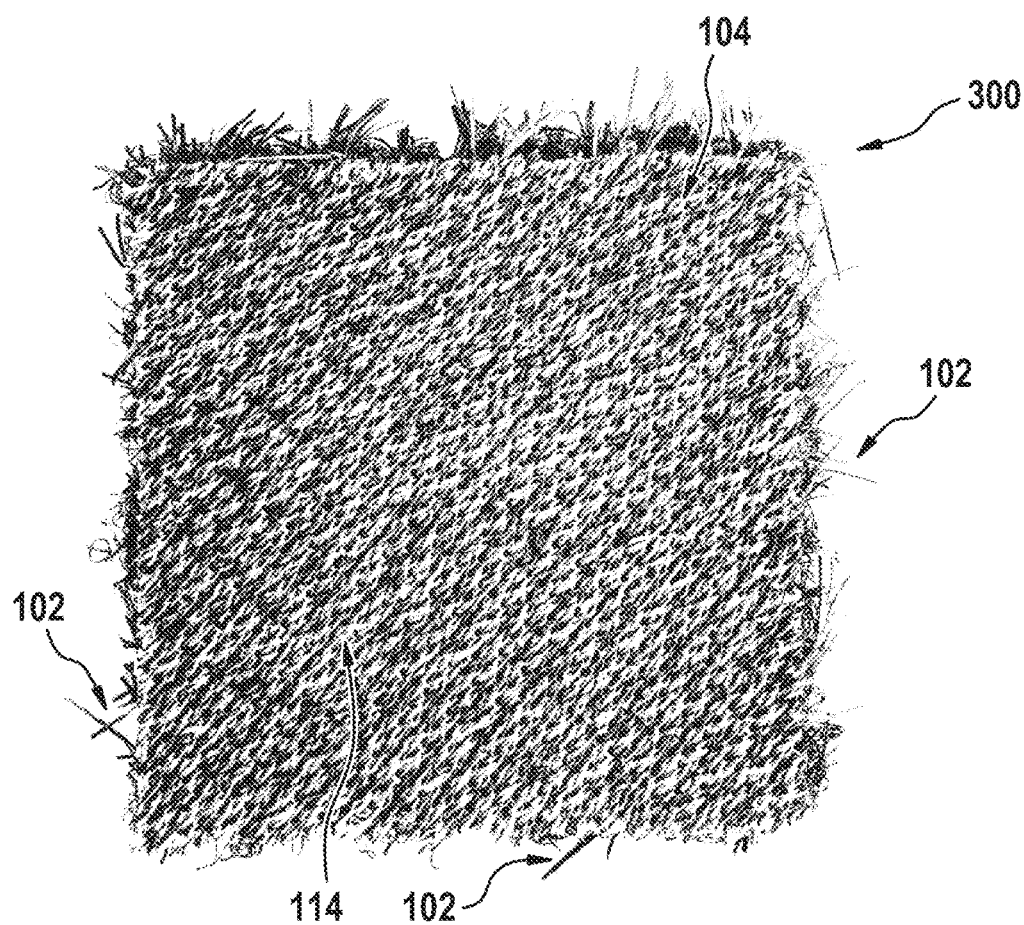
FIG. 3A is an exemplary embodiment of a synthetic turf sample, formed in accordance with the present invention.

FIG. 3A illustrates a synthetic turf 300, according to another embodiment of the present invention. The synthetic turf 300 includes synthetic turf fibers 102 and a knitted backing 104 formed by knitting together the lower portions 110 (FIG. 1) of the synthetic turf fibers 102. In addition, the synthetic turf 300 includes a polyurethane (PU) coat 114 formed on the knitted backing layer 104. The PU coat 114 may comprise any PU formed by reacting a di- or polyisocyanate with a polyol, including but not limited to, icocyanate mixtures such as 2,2'-diphenylmethane diisocyanate (2,2'-MDI)-based isocyanates, as disclosed by European Applicant Publication No. EP2262842, published on Dec. 22, 2010, the subject-matter of which is hereby incorporated in its entirety by reference.

As illustrated, the synthetic turf 300, including the PU coat 114, is substantially planar. The PU coat 114 of the present invention, provides dimensional (i.e., spatial) stability to the synthetic turf 300.

Figure 3B:
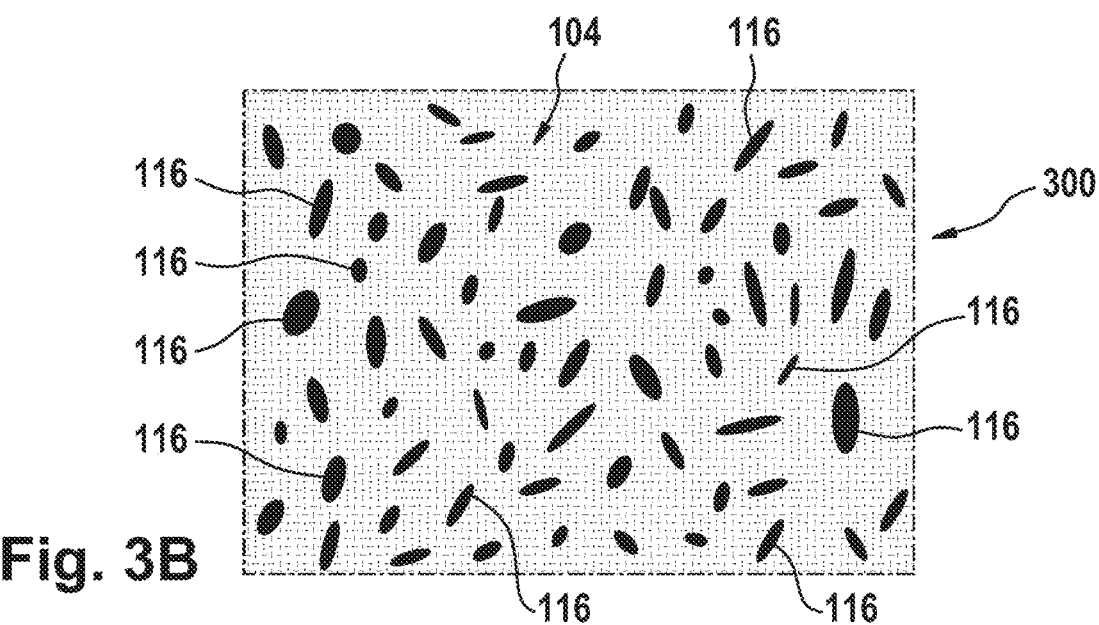
FIG. 3B is an exemplary embodiment of a synthetic turf, formed in accordance with the present invention.

FIG. 3B is a magnified section of the synthetic turf 300 illustrated in FIG. 3A, according to an embodiment of the present invention. As illustrated, the PU coat 114 includes a plurality of PU deposits 116, also referred to as PU droplets. The formation of the PU deposits 116, which is a result of applying a PU to the knitted backing layer 104, will be described more fully below in conjunction with FIG. 4. In one embodiment of the invention, and as illustrated by FIG. 3B, the PU coat 114 is an open PU coat, comprising a plurality of randomly positioned PU deposits 116 of all shapes and sizes. The scope of the present invention covers PU coats having PU deposits connected with other PU deposits as well as insular PU deposits, in any combination, as well as PU deposits that are densely spaced and PU deposits that are sparsely spaced. In other embodiments, the PU deposits 116 cover anywhere from a fraction of a given surface area of the knitted backing layer 104, such as 5% for example, to nearly 100% of the given surface area. The scope of the present invention includes all surface area coverages of the knitted backing layer 104 with PU deposits 116 that provide for dimensional (i.e., spatial) stability to the synthetic turf 300 (i.e., that enable the synthetic turf 300 with the knitted backing layer 104 to lie substantially in a plane).

The PU coat 114, including the plurality of PU deposits 116, provides for drainage of liquids, such as water or animal urine, through the PU coat 114 (e.g., from a topside (i.e., the side adjacent the knitted backing layer) to a bottom side (i.e., the side opposite the knitted backing layer)). As discussed more fully below in conjunction with FIG. 4, the PU is applied to the knitted backing layer 104 of the synthetic turf 300 as a foam, and the PU deposits 116 are randomly formed upon collapse of the foam on the knitted backing layer 104, via, for example, the weight of the foam due to gravity, or an ambient drying process, or a curing process.

In one embodiment, the PU of the PU coat 114 includes at least one water soluble salt, and by way of exemplary embodiments, may include a sodium chloride salt, an ammonium salt, and/or a benzalkonium chloride salt, although the scope of the present invention covers all water-soluble salts. As discussed more fully below in conjunction with FIG. 4, the embedded salts, upon dissolution, form a system of interconnected pathways (e.g., interconnected capillaries) in the PU deposits 116, thereby further enhancing drainage of water and/or urine through the PU coat 114.

In another embodiment, the PU of the PU coat 114 includes chalk. The addition of chalk reduces the cost per unit volume of the PU, since the added chalk acts as a bulking agent, thereby reducing the quantity of the reactive components of the PU per unit volume, such as, for example, the quantity of the isocyanates.

In other embodiments, the PU includes one or more of an isocyanate/polyol mixture, one or more water soluble salts, a chalk, and one or more polymerization catalysts and/or additives, in any combination and proportionality.

Figure 4:
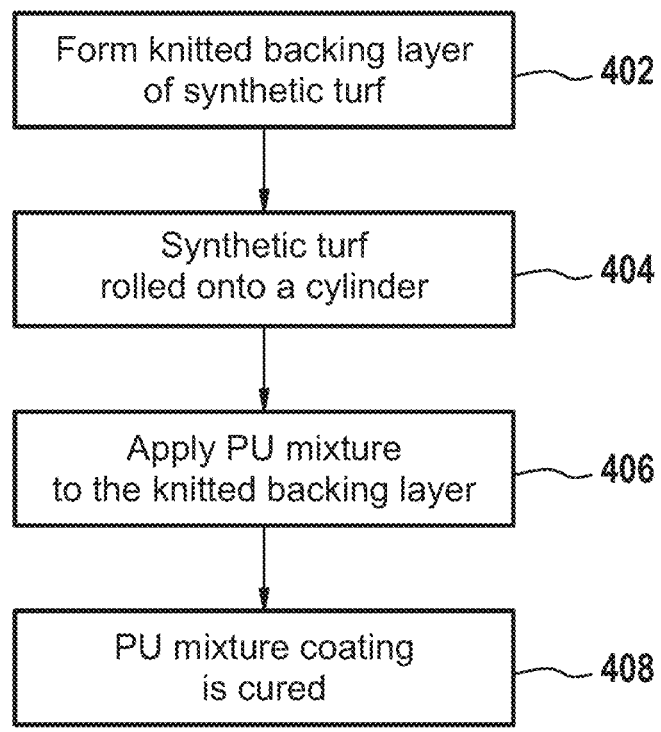
FIG. 4 is a flowchart for manufacturing a synthetic turf, in accordance with an exemplary embodiment of the present invention.

FIG. 4 illustrates a method for manufacturing a synthetic turf, such as the synthetic turf 300 illustrated in FIGS. 3, according to an embodiment of the present invention.

In step 402, synthetic turf fibers 102 are knitting together to form a knitted backing layer 104 of the synthetic turf 100 or 200. In one embodiment, each synthetic turf fiber is formed as a monofilament 106 having a base portion 110 that is either knitted with other base portions of other monofilaments to form the knitted backing layer 104, or each base portion of a row or column of fibers is connected (e.g., knitted or twisted around or tied) to a backing layer thread 112, such as a monofilament, that runs a length of the row or column, and the crisscrossed pattern of backing layer threads are then knitted to one another to form the knitted backing layer 104. In another embodiment, each synthetic turf fiber 102 is formed from two or more monofilaments, also referred to as a yarn 108, with the base portions of the two or more monofilaments twisted, tied, or otherwise interlocked together to form a yarn base portion 110. In this embodiment, each base portion 110 of the yarn 108 is either knitted with other base portions of other yarns to form the knitted backing layer, or each base portion of a row or column of yarns is connected (e.g., knitted, twisted around or tied) to a backing layer thread 112, such as a monofilament, that runs a length of the row or column, and the backing layer threads are then knitted to one another to form the knitted backing layer 104.

In another embodiment, one or more of the synthetic turf fibers 102 may be curled before being knitting together to form the knitted backing layer 104 of the synthetic turf 100 or 200. Curling synthetic turf fibers is known in the art. Curling may provide support to adjacent fibers that are not curled (i.e., are substantially straight), to give a more plush and fuller appearance and/or to give more cushion to any forces applied from above, such as forces from people or animals walking or running on a top surface of the synthetic turf.

In an optional step 404, the synthetic turf 100 or 200 with the knitted backing layer 104 may be rolled onto a cylinder (not shown), or any other type of core, for storage and/or for preparation for applying a coat of a polyurethane (PU) to the knitted backing layer 104 of the synthetic turf 100 or 200. In one embodiment, the synthetic turf 100 or 200 with the knitted backing layer 104 may be fed from the cylindrical roll, via a conveyance mechanism (not shown), such as a moving belt or tray, to apply the coat of the PU and for further processing of the synthetic turf 100 or 200.

Figure 5:
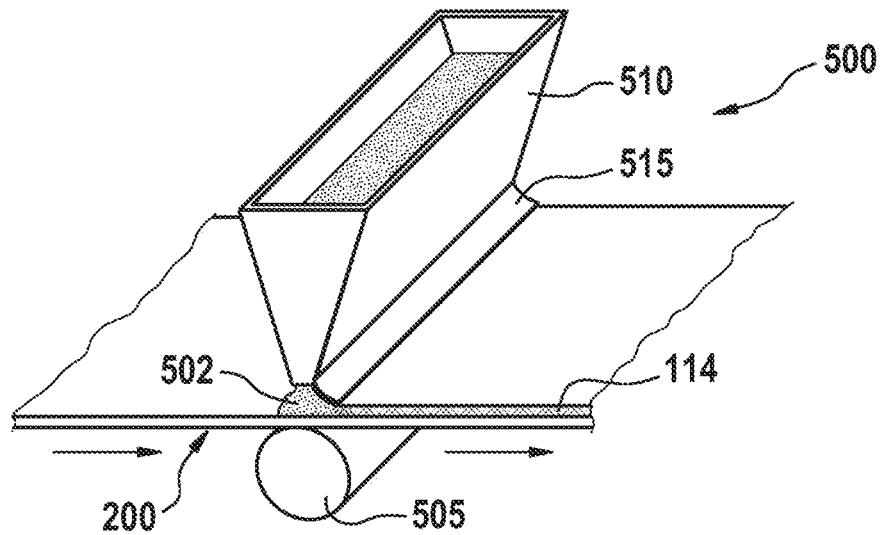
FIG. 5 is an exemplary embodiment of a knife-over-roll applicator system, formed in accordance with the present invention.

In step 406, a PU is applied to the knitted backing layer 104. In one exemplary embodiment, and as illustrated in FIG. 5, the synthetic turf 100 or 200 with the knitted backing layer 104 is passed through a knife-over-roll applicator system 500, for receiving a PU 502 for forming a coat 114 of the PU 502 on the knitted backing layer 104. The knife-over-roll applicator system 500 includes a roll 505 over which a synthetic turf 200, for example, is moved, a dispenser 510 for dispensing the PU 502 onto the knitted backing layer 104 (see FIG. 1 and/or FIG. 2), and an applicator (e.g., a knife) 515 configured to spread the dispensed PU 502 as a coat 114 on the synthetic turf 200. Knife-over-roll coating systems are well known in the art, and will not be described here in any further detail. In other embodiments, the PU is applied to the knitted backing layer 104 by an applicator (not shown) (such as a spray gun or any applicator that is adapted to dispense a polyurethane) moving across the knitted backing layer 104 of a stationary synthetic turf 100 or 200. A known to those of skill in the art, a catalyst may be added to the PU before the PU is applied to the knitted backing layer 104, or a catalyst such as ultraviolet light may be applied to the PU after the PU is applied to the knitted backing layer 104, for initiating and/or accelerating the polymerization process of the PU for solidifying the PU.

The scope of the present invention covers any polyurethane formed by reacting a di- or poly-isocyanate with a polyol, including but not limited to, icocyanate mixtures such as a 2,2'-diphenylmethane diisocyanate (2,2'-MDI)-based isocyanates. In another embodiment, the PU comprises at least one water soluble salt, and by way of exemplary embodiments, may include a sodium chloride salt, an ammonium salt, and/or a benzalkonium chloride salt, although the scope of the invention covers all water-soluble salts. Once the coat of the PU is set, either upon curing at temperature as described below in step 408, or simply by drying at ambient temperature without application of an external heat source, the embedded salts form sets of interconnected pathways (e.g., interconnected capillaries) for drainage of water or urine excreted by animals, such as dogs, cats, etc., once the embedded salts dissolve upon exposure to water and/or urine.

In one embodiment, if an animal, such as a dog, cat, or any type of pet, urinates on the synthetic turf, for example, synthetic turf 300, the urine will dissolve the embedded salts, thereby creating sets of interconnected pathways that form drainage channels throughout the PU coat 114, thereby allowing the urine to drain through the synthetic turf 300. The interconnected pathways drain any urine or puddles of urine (or water) that would otherwise form on a topside of the synthetic turf 300 (e.g., in the knitted backing layer 104), thereby preventing urine from collecting or saturating the synthetic turf 300, and thus reducing or eliminating odors from the synthetic turf 300 or the formation of harmful bacteria from growing within the synthetic turf 300. In one embodiment, the embedded salt, such as the benzalkonium chloride salt, not only forms interconnected pathways upon dissolution, but also has anti-microbial properties which counter microbes from forming within the synthetic turf 300.

In yet another embodiment of the invention, the PU includes chalk. The addition of chalk reduces the cost per unit volume of the PU, since the chalk serves as a bulking agent, thereby reducing the quantity of reactive components of the PU per unit volume, such as the isocyanates and/or polyols.

In other embodiments, the PU includes one or more of an isocyanate/polyol mixture, one or more water soluble salts, a chalk, and one or more polymerization catalysts and/or additives, in any combination and proportionality.

In one embodiment, the PU is in liquid form, having a range of viscosity, depending upon the type and proportionality of the components of the PU and the ambient temperature.

In another embodiment of the invention, the PU is applied as a foam or a foam coat to the knitted backing layer 104 of the synthetic turf 300. In one embodiment, one or more additives are added to the PU, and either the one or more additives chemically react with each other, or the one or more additives react with the PU, to transition the PU, which is initially in liquid form, to a PU foam. In another embodiment, the PU is "foamed" by mechanical agitation, including, for example, but not limited to, high-speed mixing of the PU and/or oscillation of the PU. The oscillation may include a pressure oscillation of the PU (i.e., creating pressure pulses within the PU) that periodically compress the PU for forming the PU foam. For example, the cyclical compression and expansion of the PU creates an unpolymerized foam, also referred to as padding. The padding may then be applied to the knitted backing layer 104 of the synthetic turf 300, for example, by way of the roll-over-knife applicator system 500 as described above. For example, the PU padding has weight of 300-400 g/l and is applied at a speed of 26 ft/min in the "knife over roll coating" onto the backing. The applied layer of PU foam collapses before is binds in the following oven at a temperature above ambient temperature, e.g. 80 degrees Celsius, to form an open PU layer of randomly distributed PU deposits having an average weight of 250-300 g/m2.

After application of the PU as a foam to the knitted backing layer 104, but before polymerization of the PU foam is complete, the foam collapses. The collapsed foam may form a porous PU coat, such as PU coat 114, comprising patches of connected or insular deposits of PU, such as PU droplets 116 (also referred to as PU deposits 116), deposited on the knitted backing layer 104. The PU coat 114 having the randomly positioned PU deposits 116, formed upon collapse of the PU foam, provides a porous system for draining water or urine from a topside of the synthetic turf 300 to a bottom side of the synthetic turf 300 via the coat 114. The knitted backing layer 104 is advantageous over a conventional synthetic turf backing, in that it enables the PU foam to collapse in such a manner as to form a more open PU coat 114, thereby providing better drainage.

In one embodiment, the PU is "foamed," either chemically and/or mechanically, to form an unpolymerized foam having a density between 300-400 grams per liter.

Figure 6:
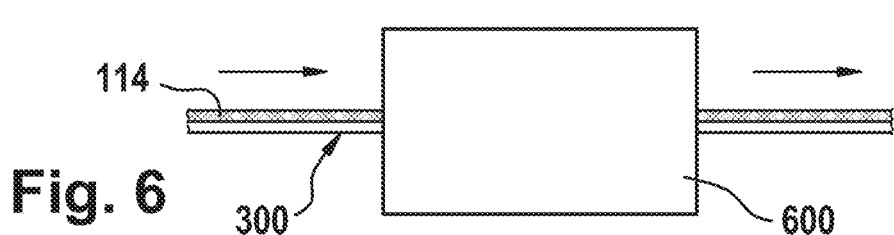
FIG. 6 is exemplary embodiment of a curing oven, formed in accordance with the present invention.

In step 408, the PU coat 114 applied to the knitted backing layer 104 of the synthetic turf 300 is cured. In one embodiment, a mobile heat gun (not shown) is moved across the PU coat 114 of the knitted backing layer 104 for curing the PU coat 114. In another embodiment, and as illustrated by FIG. 6, the synthetic turf 300 with the PU coat 114 is conveyed though an curing oven 600 (e.g., conveyed via a belt or tray or other means of conveyance known in the art) for curing the PU coat 114. In one embodiment, the PU coat 114 is cured at 80° C. In yet another embodiment, the PU coat 114 applied to the knitted backing layer 104 of the synthetic turf 300 is cured at an ambient temperature, with no application of heat from an artificial source such as a heat gun or oven. In another embodiment, the synthetic turf 300 is moved through the oven 600 at a speed of 26 feet/minute, although the scope of the invention covers a range of speeds.

Figure 7:
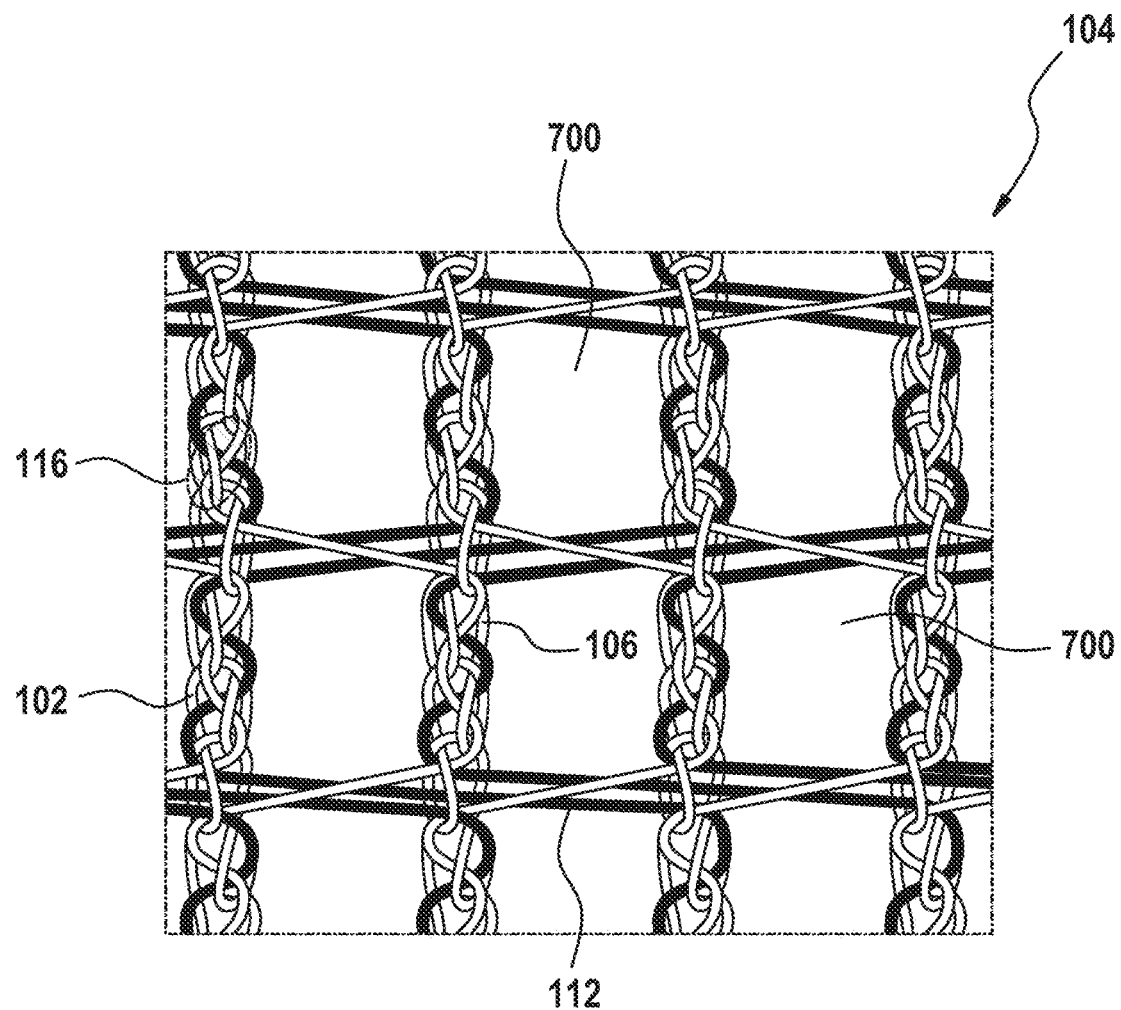
FIG. 7 is a bottom view of an exemplary embodiment of a knitted backing layer.

In accordance with the embodiment of FIG. 7 openings 700 are formed in the knitted backing layer 104 (the extensions of the fibers 102 and 106 into the vertical dimension are not illustrated for ease of explanation and illustration).

PU deposits 116 (cf. FIG. 3B) can be formed at random, pseudo-random or regular intervals on the knitted backing layer 104, i.e. on the fibers 102, 106 and/or 112. Preferably the size of the PU deposits is smaller than the openings 700 as shown in FIG. 7 for exemplary deposit 116. Alternatively, the PU deposit may have the form of a grid-like structure with openings that are aligned with the openings 700.

While this invention has been described with respect to at least one embodiment, the present invention can be further modified within the scope of this disclosure. This application is therefore intended to cover any variations, uses, or adaptations of the invention using its general principles. Further, this application is intended to cover such departures from the present disclosure that are within known or customary practice in the art to which this invention pertains and which fall within the limits of the appended claims.

Embodiments may Comprise One or More of the Following Combinations of Features:

1. A synthetic turf (300),
   characterized by comprising:
   a plurality of synthetic turf fibers (102) knitted together to form a knitted backing layer (104) of the synthetic turf; and
   a water permeable polyurethane, PU, coat (114) on the knitted backing layer.

2. The synthetic turf according to claim 1, wherein the PU coat comprises a random distribution of PU deposits (116) formed by collapsed PU foam.

3. The synthetic turf according to claim 1 or 2, the synthetic turf fibers being formed of a polymer mixture which is at least a three-phase system, wherein the polymer mixture comprises a first polymer, a second polymer, and a compatibilizer, wherein the first polymer and the second polymer are immiscible, wherein the first polymer forms polymer beads surrounded by the compatibilizer within the second polymer.

4. The synthetic turf according to any preceding claim, wherein each synthetic turf fiber of the plurality of synthetic turf fibers comprises one of a monofilament (106) and a yarn (108), the yarn comprising a bundle of interlocking monofilaments.

5. The synthetic turf according to any preceding claim, wherein one or more synthetic turf fibers of the plurality of synthetic turf fibers are curled.

6. The synthetic turf according to any preceding claim, wherein the PU coat comprises a random or pseudo-random distribution of PU deposits (116), and wherein the distribution of PU deposits enables the PU coat to be water permeable.

7. The synthetic turf according to claim 6, wherein the knitted backing layer has a surface area, and wherein the distribution of PU deposits covers at least 1%, preferably at least 10%, preferably between 10% to 50% of the surface area.

8. The synthetic turf according to claims 6 or 7, wherein each PU deposit of the PU deposits is porous to water.

9. The synthetic turf according to claim 8, wherein said each PU deposit of the PU deposits comprises one or more capillaries.

10. The synthetic turf according to any of claims 1-9, wherein the PU coat is porous to water.

11. The synthetic turf according to claim 12, wherein the PU coat comprises one or more capillaries.

12. The synthetic turf according to any preceding claim, wherein the PU coat comprises an isocyanate mixture.

13. The synthetic turf according to claim 12, wherein the isocyanate mixture comprises a 2,2'-diphenylmethane diisocyanate (2,2'-MDI)-based isocyanate mixture.

14. The synthetic turf according to any preceding claim, wherein the PU coat comprises at least one water soluble salt.

15. The synthetic turf according to claim 12, wherein the at least one water soluble salt comprises at least one of: a sodium chloride salt, an ammonium salt, and a benzalkonium chloride salt.

16. The synthetic turf according to any preceding claim, wherein the PU coat comprises a chalk.

17. The synthetic turf according to any preceding claim, wherein the PU coat is a cured PU coat.

18. The synthetic turf according to any of the preceding claims, wherein the PU coat coats the knitted backing layer at at least 50 g/m$^2$, preferably at least 100 g/m$^2$, preferably between at 250-300 g/m$^2$.

19. A method for manufacturing a synthetic turf (300), characterized by comprising:
   knitting together a plurality of synthetic turf fibers (102) for forming a knitted backing layer (104) of the synthetic turf; and
   applying a polyurethane, PU, to the knitted backing layer for forming a PU coat (114).

20. The method for manufacturing a synthetic turf according to claim 7, wherein each synthetic turf fiber of the plurality of synthetic turf fibers comprises one of a monofilament (106) and a yarn (108), the yarn comprising a bundle of interlocking monofilaments.

21. The method for manufacturing a synthetic turf according to any preceding claim, further comprising curling one or more synthetic turf fibers of the plurality of synthetic turf fibers before knitting together the plurality of synthetic turf fibers.

22. The method for manufacturing a synthetic turf according to any preceding claim, wherein applying the PU to the knitted backing layer comprises applying the PU as a PU foam, wherein upon collapse of the PU foam, the PU coat comprises a random distribution of PU deposits (116), and wherein the random distribution of PU deposits enables the PU coat to be water permeable.

23. The method for manufacturing a synthetic turf according to claim 22, further comprising creating the PU foam by adding a foaming additive to the PU and/or mechanically agitating the PU, the PU foam comprising an unpolymerized foam.

24. The method according to claim 23, wherein mechanically agitating the PU comprises at least one of: mixing the PU and applying pressure pulses to the PU.

25. The method for manufacturing a synthetic turf according to claims 23 or 25, wherein the unpolymerized foam has a density between 300-400 grams per liter.

26. The method for manufacturing a synthetic turf according to any preceding claim, wherein the PU comprises an isocyanate mixture.

27. The method for manufacturing a synthetic turf according to claim 26, wherein the isocyanate mixture is a 2,2'-diphenylmethane diisocyanate (2,2'-MDI)-based isocyanate mixture.

28. The method for manufacturing a synthetic turf according to any preceding claim, wherein the PU comprises at least one water soluble salt.

29. The method for manufacturing a synthetic turf according to claim 28, wherein the at least one water soluble salt comprises at least one of: a sodium chloride salt, an ammonium salt, and a benzalkonium chloride salt.

30. The method for manufacturing a synthetic turf according to any preceding claim, wherein the PU comprises a chalk.

31. The method for manufacturing a synthetic turf according to any preceding claim, wherein applying the PU to the knitted backing layer comprises applying a knife over roll coating of the PU to the knitted backing layer for forming the PU coat.

32. The method for manufacturing a synthetic turf according to any preceding claim, further comprising curing the PU coat.

33. The method for manufacturing a synthetic turf according to claim 32, wherein curing the PU coat further comprises curing the PU coat at 80° C.

34. Usage of the synthetic turf (300) in accordance with any one of claims 1 to 18 to provide ground flooring for animals, such as mammals, in particular pets, in particular dogs.

35. Usage of the synthetic turf (300) in accordance with any one of claims 1 to 18 as a ground flooring for animal stables.

The invention claimed is:

1. A synthetic turf, characterized by comprising:
   a plurality of synthetic turf fibers knitted together to form a knitted backing layer of the synthetic turf;
   anchoring lines formed of a polymer material having a polar surface, the anchoring lines knitted into the knitted backing layer; and
   a water permeable polyurethane, PU, coat on the knitted backing layer,
   wherein the PU coat comprises a random or pseudo-random distribution of insular PU deposits formed by collapsed PU foam, wherein each insular PU deposit includes one or more capillaries and is porous to water,
   wherein the porosity and the distribution of the insular PU deposits enables the PU coat to be water permeable, and
   wherein the PU coat coats the knitted backing layer at between 7.37-8.85 ounces/yard$^2$.

2. The synthetic turf according to claim 1, the synthetic turf fibers being formed of a polymer mixture which is at least a three-phase system, wherein the polymer mixture comprises a first polymer, a second polymer, and a compatibilizer, wherein the first polymer and the second polymer are immiscible, wherein the first polymer forms polymer beads surrounded by the compatibilizer within the second polymer in an intermediate product of the polymer mixture.

3. The synthetic turf according to claim 1, wherein the knitted backing layer has a surface area, and wherein the distribution of the insular PU deposits covers at least 1% of the surface area.

4. The synthetic turf according to claim 1, wherein the PU coat is porous to water.

5. The synthetic turf according to claim 4, wherein the PU coat has a water permeability of between 800 and 1200 liters/min·m$^2$ as measured according to ASTM F 1551.

6. The synthetic turf according to claim 1, wherein the knitted backing layer has a surface area, and wherein the distribution of the insular PU deposits covers at least 10% of the surface area.

7. The synthetic turf according to claim 1, wherein the knitted backing layer has a surface area, and wherein the distribution of the insular PU deposits covers between 10%-50% of the surface area.

8. The synthetic turf according to claim 1, wherein the anchoring lines comprise polyester anchoring lines.

9. A method for manufacturing a synthetic turf, characterized by comprising:
   knitting together a plurality of synthetic turf fibers for forming a knitted backing layer of the synthetic turf;
   knitting anchoring lines into the knitted backing layer, wherein the anchoring lines are formed of a polymer material having a polar surface; and
   applying a polyurethane, PU, to the knitted backing layer for forming a PU coat at between 7.37-8.85 ounces/yard$^2$,
   wherein applying the PU to the knitted backing layer comprises applying the PU as a PU foam,
   wherein upon collapse of the PU foam, the PU coat comprises a random distribution of insular PU deposits, wherein each insular PU deposit includes one or more capillaries and is porous to water, and
   wherein the porosity and the random distribution of the insular PU deposits enables the PU coat to be water permeable.

10. The method for manufacturing a synthetic turf according to claim 9, further comprising creating the PU foam by adding a foaming additive to the PU and/or mechanically agitating the PU, the PU foam comprising an unpolymerized foam.

11. The method for manufacturing a synthetic turf according to claim 10, wherein the unpolymerized foam has a density between 300-400 grams per liter.

12. The method for manufacturing a synthetic turf according to claim 9, wherein applying the PU to the knitted backing layer comprises applying a knife over roll coating of the PU to the knitted backing layer for forming the PU coat.

13. The method for manufacturing a synthetic turf according to claim 9, further comprising curing the PU coat.

* * * * *